March 23, 1926.

J. E. JACOBSON

SPRAYING DEVICE

Filed Oct. 10, 1925

1,578,129

Inventor
John E. Jacobson.

Attorney.

Patented Mar. 23, 1926.

1,578,129

UNITED STATES PATENT OFFICE.

JOHN E. JACOBSON, OF OLYMPIA, WASHINGTON.

SPRAYING DEVICE.

Application filed October 10, 1925. Serial No. 61,714.

*To all whom it may concern:*

Be it known that I, JOHN E. JACOBSON, a citizen of the United States, residing at Olympia, in the county of Thurston and State of Washington, have invented a new and useful Improvement in Spraying Devices, of which the following is a full, clear, and exact description, such as will enable others skilled in the art to which it appertains to make and use the same.

This invention relates to a spraying device, the principal object of the invention being to provide a device in which the ordinary city water supply is utilized to provide the pressure for operating the sprayer.

Another object of this invention is to provide means whereby the device may be easily transported to any place desired.

Figure 1:
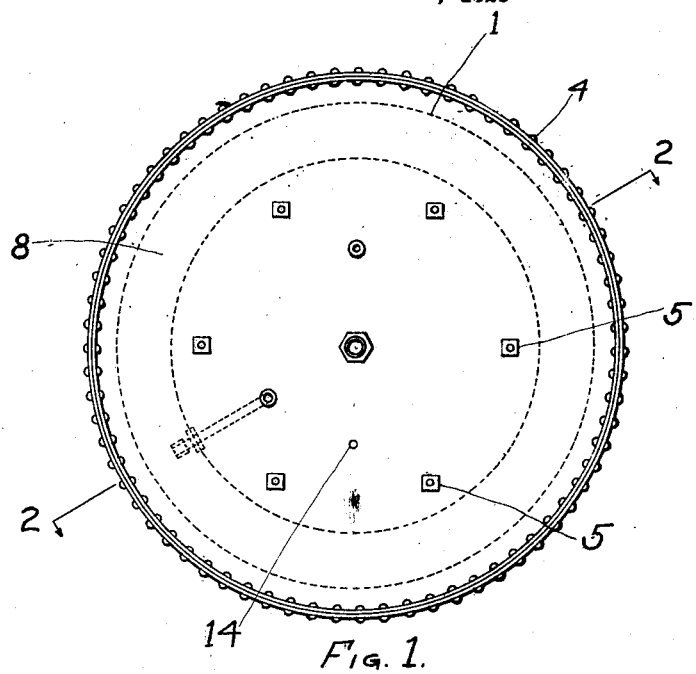
Figure 2:
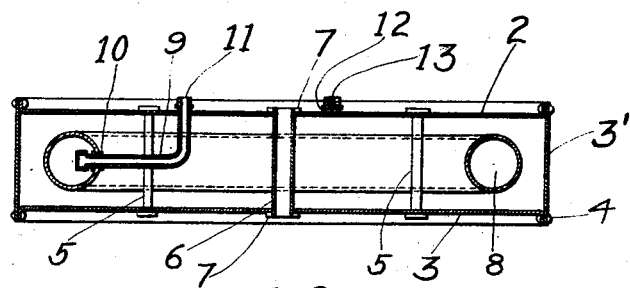
Figure 3:
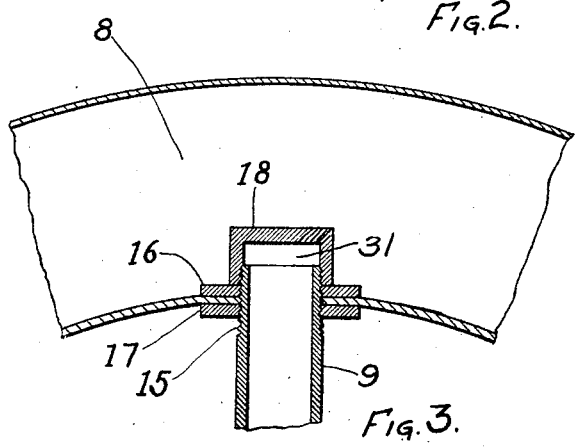

With these and other objects in view, the invention consists in the construction, arrangement and combination of the various parts of my device whereby the objects above set forth are attained as hereinafter more fully set forth, pointed out in my claims, and illustrated in the accompanying drawing, in which:

Figure 1 is a side elevational view, Figure 2 is a cross section taken on the lines 2—2 of Figure 1, and Figure 3 is a cross sectional view of the connection made with the spraying tank.

In describing my invention in detail similar reference characters will be used to indicate like parts in the various views.

In the drawing 1 indicates a cylindrical container having sides 2 and 3, preferably formed of galvanized sheet metal, and which sides are secured to the circular band of sheet metal 3' by means of rivets 4 or any other suitable fastening means.

The sides 2 and 3 are held from bulging by the bolts 5, which are spaced equidistant from the centers of the sides.

Through the exact center of the device a pipe 6 passes and is secured to the sides by the nuts 7. Through this pipe any suitable member may be passed and the pipe will then serve as a bearing by means of which the entire device may be trundled to any place desired.

Disposed within the tank and positioned in close proximity to the band 3 is a flexible rubber or canvas container 8, in which the spraying medium, paints, staining materials, auto cleaning materials, or any other similar substance which it is desired to spray upon a surface may be placed.

Leading from the side 2 is an L-shaped pipe 9 which is connected to the spraying container at 10. The horizontal portion of the pipe 9, which communicates with the exterior of the tank, is provided with a threaded opening 11 which is adapted to fit the ordinary garden watering hose.

There is also an opening 12 in the side 2, which is threaded as shown at 13 so that a hose connected to the water supply may be attached thereto.

There is also provided in the side 2 an air-valve 14, whereby air may be allowed to enter the tank when it is desired to remove some of the water therefrom.

The pipe 9 is connected to the spraying tank 8 as shown in Figure 3. The lower end of the pipe 9 is threaded at 15, and has threaded thereon two washers 16 and 17, disposed upon opposite sides of the material constituting the tank 8. Upon the interior end of the pipe 9 is threaded a guard 18, having openings 31 provided therein to allow the spraying material to pass from the tank 8 into the pipe 9 and thence through the hose attached at the threaded end of the pipe 9.

The operation of the device is as follows:

The tank 8 is first filled with the material to be sprayed through the pipe 9. The spraying hose is then attached at 11 and a hose connected to the water supply is threaded in the opening 12. The water pressure generated in the interior of the tank forces the spraying material out of the flexible tank 8 through the pipe 9 and thence through the spraying hose. It will be noted that by means of this device, I make use of a non-circulating water pressure with which to secure the requisite pressure for operating the spraying device.

When the spraying tank is emptied, it is only necessary to disconnect the water supply and remove enough water from the water tank to equal the amount of spraying material that it is desired to insert into the tank 8.

Various changes may be made in the construction and arrangement of the invention above set forth without departing from the spirit and real purpose thereof and it is my intention to cover by the following claims any modified forms of structure or use of mechanical equivalence which may be reasonably included within their scope.

I claim:

1. In a device of the class described, a cylindrical tank having an inlet means for placing the interior of said tank under pressure, an annular flexible receptacle having an outlet extending through said tank, said receptacle being disposed within said tank adjacent the entire perimeter thereof and means engageable with a rod whereby said tank may be wheeled wherever desired.

2. In a device of the class described, a rigid tank having an inlet, an annular compressible receptacle having an outlet extending through said tank, said receptacle being disposed within said tank adjacent the entire perimeter thereof, means including a non-circulating water supply for compressing said receptacle and means engageable with a rod whereby said tank may be wheeled.

3. In a device of the class described, a cylindrical tank having an inlet, an annular compressible receptacle disposed within said tank and having an outlet through said tank, means for compressing said annular receptacle and means preventing the bulging of the sides of said tank and preventing the inward movement of said annular receptacle.

4. In a device of the class described, a cylindrical tank having an inlet, an annular compressible receptacle within said tank having an outlet extending through said tank and means engageable with a rod whereby said tank may be wheeled wherever desired.

5. In a device of the class described, a cylindrical tank having an inlet, a compressible receptacle within said tank having an outlet extending through said tank, and means including a bearing extending through the tank at the axis thereof whereby said tank may be trundled from place to place.

6. In a device of the class described, a cylindrical tank having an inlet, an annular compressible receptacle adapted to hold a spraying material within said tank, means whereby said spraying material may be led to the exterior of said tank, means for compressing said receptacle and means preventing inward movement of said annular receptacle.

7. In a device of the class described, a tank having an inlet, means holding the sides of said tank from bulging, an annular compressible receptacle having an outlet extending through said tank, said receptacle being disposed between the perimeter of said tank and said holding means whereby inward movement of said receptacle is prevented and means for compressing said receptacle.

JOHN E. JACOBSON.